Nov. 6, 1945.　　　　W. B. RUGER　　　　2,388,443
FIRING MECHANISM
Filed June 9, 1944　　　　9 Sheets-Sheet 9

Inventor
William B. Ruger
by Roberts, Cushman & Groves
Attys.

Patented Nov. 6, 1945

2,388,443

UNITED STATES PATENT OFFICE 2,388,443

FIRING MECHANISM

William B. Ruger, Westport, Conn., assignor to Maguire Industries, Incorporated, Bridgeport, Conn., a corporation of New York Application June 9, 1944, Serial No. 539,503

18 Claims. (Cl. 89—2)

This invention relates to firing mechanism which controls the operation of a gun in both semi-automatic fire and automatic fire. In a gun having these two types of fire it is desirable that the breech remain open at the suspension of automatic fire and that the breech be closed after each shot of semi-automatic fire. The present invention provides firing mechanism that will meet these requirements while at the same time providing certain further advantages.

The firing mechanism is provided with a suitable means, such as a fire control lever, for determining the type of fire, and also for locking the gun in a safety position. It is an object of this invention to prevent the parts of the gun from being put into any potentially dangerous condition in which operation of the fire control means might cause the gun to fire.

It is a further object of the invention to provide a mechanism in which the fire control means can be set for either type of fire, semi-automatic or automatic, without requiring any manual manipulation of any of the other parts of the gun, such as the slide. More particularly, it is an object of the invention to provide a firing mechanism which will permit the type of fire to be changed from semi-automatic fire to automatic fire without the necessity for moving the slide rearwardly before commencing automatic fire.

It is a further object to provide a firing mechanism which will automatically cause the slide to move forward to close the breech when the fire control means is shifted from automatic fire to semi-automatic fire, and to do this without any danger of firing the gun.

In a preferred embodiment of the gun the hammer is controlled by a manually controlled sear during semi-automatic fire. It is an object of the invention to cause the hammer to be under the control of this manually controlled sear not only when the mechanism is set for semi-automatic fire but also when it is set in a safety position and further when set for automatic fire but before such automatic fire has been begun. In other words, it is an object of the invention to provide that the fire control means shall not immediately displace the manually controlled sear from its control over the hammer, but that the manually controlled sear shall continue to exercise control over the hammer until, by pulling the trigger, automatic fire has been begun.

It is a further object of the invention to insure that the hammer shall be retained in a cocked position, so that as far as the hammer is concerned, the gun will always be in condition to fire upon setting the fire control means for either semi-automatic or automatic fire. Conditions may arise in which a gun may stop firing without a final retraction of the action slide, and hence without cocking the hammer. The gun, of course, then can not be fired with either semi-automatic or automatic fire until the hammer has been cocked manually. The invention provides that the fire control means can not be turned to the safety position until the hammer has been cocked. This assures that when the gun of the present invention is carried in the safety position, its hammer is known to be cocked and ready to operate either automatically or semi-automatically upon mere turning of the fire control means. Since in order to change the setting of the gun from either semi-automatic to automatic, or vice versa, it is necessary to pass through safety position, it is also assured that in any change of the gun from one setting to another, the hammer will be found to be cocked.

The firing mechanism illustrated and described herein is of the independent hammer type, wherein the gun is fired by a hammer which is separate from the recoiling action slide, which is of advantage in permitting a slower cyclic rate of automatic fire than otherwise. Moreover, in the gun of this invention the mechanism for controlling the hammer can be removed bodily as a self-contained unit.

Other objects of invention and features of advantage will be apparent from this specification and its drawings, wherein the invention is explained by way of example.

In the drawings:

Fig. 1 is a right side elevation of the rear portion of a machine gun provided with the firing mechanism of this invention, the casing of the gun being broken away to expose inner parts, and certain parts being shown in vertical section, the trigger being pulled and the gun being in the act of firing. The firing mechanism of the present invention is shown in its place in the gun;

Fig. 1ª is a right side elevation of a portion of the gun, showing the fire control handle and a spring element which constitutes a stop for the handle;

Fig. 7 is a view similar to Fig. 6, showing the hammer temporarily retained by the automatic sear, after one or more semiautomatic shots have intervened between Fig. 6 and Fig. 7. In Fig. 7 the trigger is shown as still pulled for the preceding shot. When the trigger is released, the parts then resume the position of Fig. 6;

Figs. 9, 10 and 11 represent a cycle of automatic fire which is continued as long as the trigger is pulled;

The firing mechanism of this invention is adapted to provide automatic and semi-automatic control of the hammer in a variety of forms of gun having an automatically retracting breech-block, action slide or any equivalent retracting member, regardless of the particular means by which the retraction is caused, whether by recoil, a gas piston, or other means. The firing mechanism is shown as constructed as a removable unit, comprising the hammer and its associated mechanism with the exception of the firing pin or like firing member which is struck by the hammer and the action slide or like retracting member that pushes the hammer back to cocked position.

By way of example, the firing mechanism of this invention is herein shown as applied to a gun having various features invented by me, although, as indicated above, the present invention is applicable to various types of guns.

Figures 1, 1A:
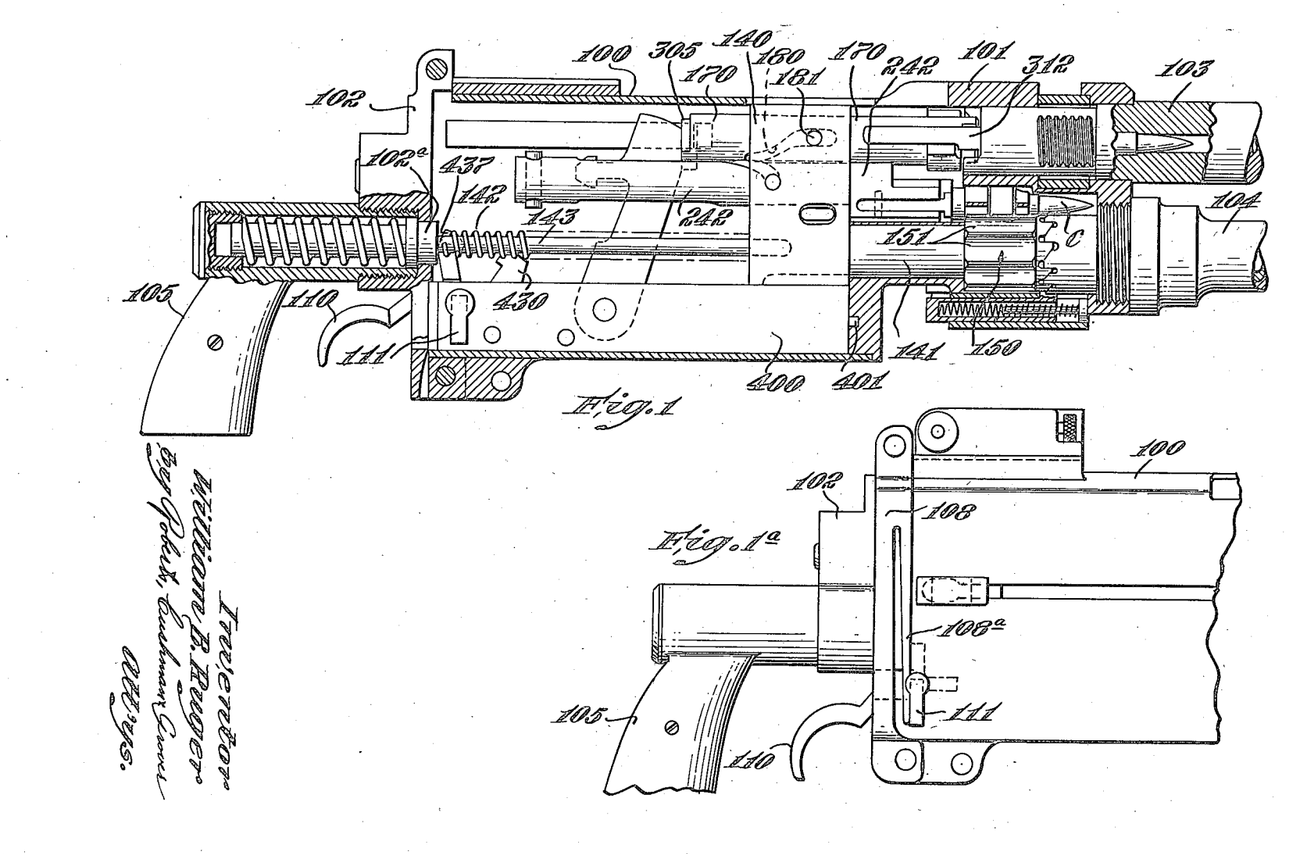

Referring to Fig. 1, the general external features of the gun are shown as including a receiver casing 100 which may be of tubing, a receiver front section 101 suitably attached to the front of the receiver casing as by welding, a receiver rear plate 102, a barrel 103, gas piston mechanism which includes the piston tube 104, and a suitable pistol grip 105.

The gun as shown in Fig. 1, and other figures, also includes a suitable trigger 110 and a fire control handle 111, which parts, as will be explained below, constitute parts of the removable firing mechanism.

Before describing the structure of the gun of Fig. 1 in detail, it may be explained that the gas piston mechanism, herein shown by way of example, operates two general sets of mechanism, namely, a cartridge belt feeder for advancing the belt of cartridges into the gun, and a reciprocating action slide which operates all of the other automatic and semi-automatic mechanism of the gun. More particularly, this action slide brings about the reciprocation, locking and unlocking of the bolt, the operation of the cartridge feeder (which both removes the cartridges from the belt and elevates them into position to be put into the breech), and, as indicated above, the cocking of the hammer.

The action slide, indicated at 140, has the general cross-section of the interior of the upper portion of the receiver, and is adapted to slide back and forth therein.

The gas piston consists essentially of a piston rod 141 (Fig. 1) secured to the action slide 140 and extending therefrom forwardly into the piston tube 104. The action slide 140 and the greater portion of the length of the piston rod 141 are bored to receive a compression spring 142 of which the forward end lies within the piston rod 141 and the rear end abuts against a spring-cushioned bumper 102a normally projecting forwardly from the inner face of the rear plate 102. The spring, in addition to being guided by the bore in slide 140 and piston rod 141, is further guided by an interior pin 143 projecting forwardly from the bumper 102a. Spring 142 has a force sufficient to restore the reciprocating action slide 140 and the gas piston to the position shown in Fig. 1 after the gas piston has forced these parts rearwardly.

As shown in Fig. 1, a cartridge-belt feeding wheel 150 is provided having its periphery shaped in the form of a plurality of concave axially disposed grooves 151 adapted to engage the belt of cartridges C. The cartridge-belt feeding wheel is rotated step by step by the piston rod 141, by means of mechanism not forming part of this present invention, for instance the mechanism described in my application Serial No. 351,727, filed August 7, 1940, to advance the belt of cartridges into the gun.

A bolt 170 is rotatably and slidably mounted in the upper portion of the action slide 140. The bolt is locked and unlocked by means of double cam slots 180 on opposite sides of the bolt and a pin 181 extending through the bolt and these two cam slots and carried by the reciprocating action slide 140. The shape of these cam slots 180 is such that during the first portion of rearward travel of the action slide the bolt is rotated to unlock it, and during the last portion of the forward travel of the bolt, it is rotated to lock it in firing position.

As soon as the action slide moves backwardly far enough to unlock the bolt from the firing position, the bolt and action slide are locked together so that the bolt accompanies the action slide on its further rearward movement without rotation. On the return movement, the bolt likewise accompanies the action slide until the bolt is pressed against the breech, whereupon the pin 181 acts through the curved portions of the cam slots 180 to rotate the bolt to locking position.

The bolt contains any suitable firing pin mechanism adapted to be struck by the hammer, and this firing pin mechanism may, for example, include a firing pin actuating member of which the tailpiece 305 lies at the rear of the bolt in position to be struck by the hammer when the bolt is locked in firing position.

Although the mechanism for delivering the cartridges to the barrel and removing the empty shells does not form a part of this invention, the gun of Fig. 1 is for completeness shown as provided with mechanism for this purpose. Briefly, this mechanism includes a cartridge feeder 242 having a shank mounted to rotate and slide in a hole in the action slide, and shaped and adapted at its forward end to engage and extract a cartridge from the belt which is advanced by the wheel 150, to elevate the cartridge into the path of the bolt and to hold the cartridge while the advancing bolt is pushing the cartridge toward the breech. The bolt is also preferably provided with a suitable extractor 312 and ejector mechanism, not shown.

Many of the above parts have been referred to herein merely to show one form of gun to which the present invention is applicable. It will be understood that the action slide is the only part of the gun which acts upon the firing mechanism, and that the firing mechanism only acts upon the other parts of the gun through the firing pin mechanism and action slide, so that, aside from having an action slide or its equivalent and firing pin mechanism or its equivalent, the gun can have a great variety of constructions.

It has been explained above how the action slide is thrown to the rear after each shot, and how a compression spring 142 tends to restore the slide to firing position. The firing mechanism now to be described preferably is constructed in the form of a removable unit and is capable of cooperating with the slide and firing pin mechanism to do the following general operations.

(a) In semi-automatic operation of the gun, allow the action slide and the bolt carried thereby to return to firing position and retain the hammer against firing until the trigger is again pulled.

(b) During automatic firing, allow the action slide and bolt to return to firing position and then cause the hammer to fire automatically.

(c) At the end of a burst of automatic fire, retain the action slide in its rear position, leaving the breech open, and retain the rammer against firing until the trigger is again pulled.

(d) In "safety position," prevent the gun from being fired.

The firing mechanism is preferably mounted in a frame 400 which is shown as having a rectangular shape and fitting in the receiver beneath the action slide 140. A projection 401 on the forward end of this frame is adapted to extend into a slot in the receiver front section, as shown in Fig. 1, and the frame 400 is removably secured in place by the rear plate 102 of the receiver.

Figure 10:
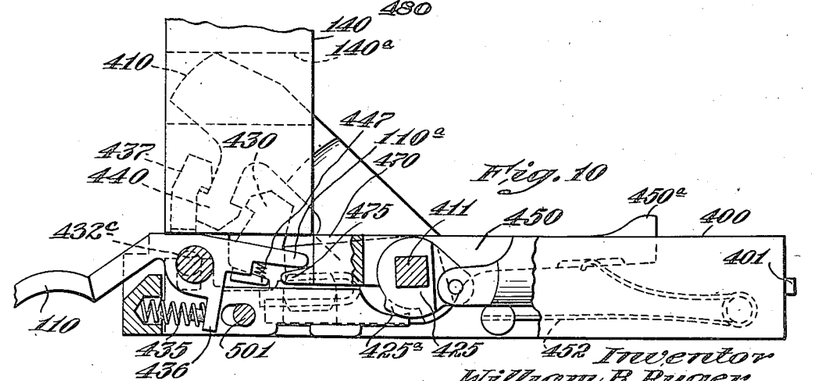
Fig. 10 is a view similar to Figs. 8 and 9, showing the firing mechanism set for automatic fire, the hammer being shown as having been thrown back by the action slide and as momentarily held down by the action slide, the trigger still being pulled.
Figure 11:
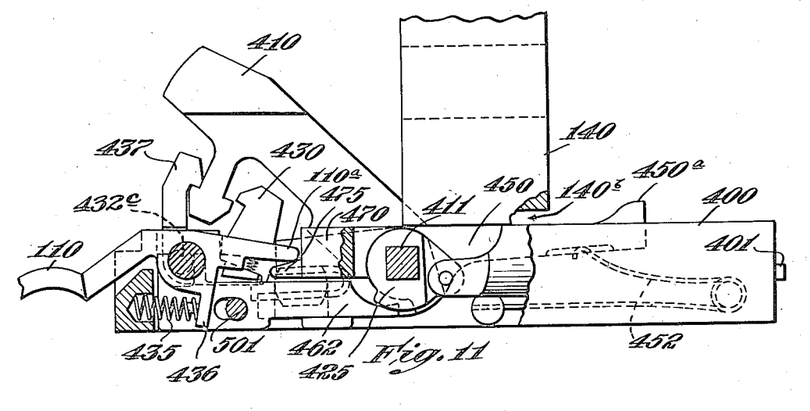
Fig. 11 is a view similar to Figs. 8, 9 and 10, showing the firing mechanism set for automatic fire, the action slide moving forward, and the hammer momentarily held by the automatic sear.
Figures 12, 13, 14, 15:
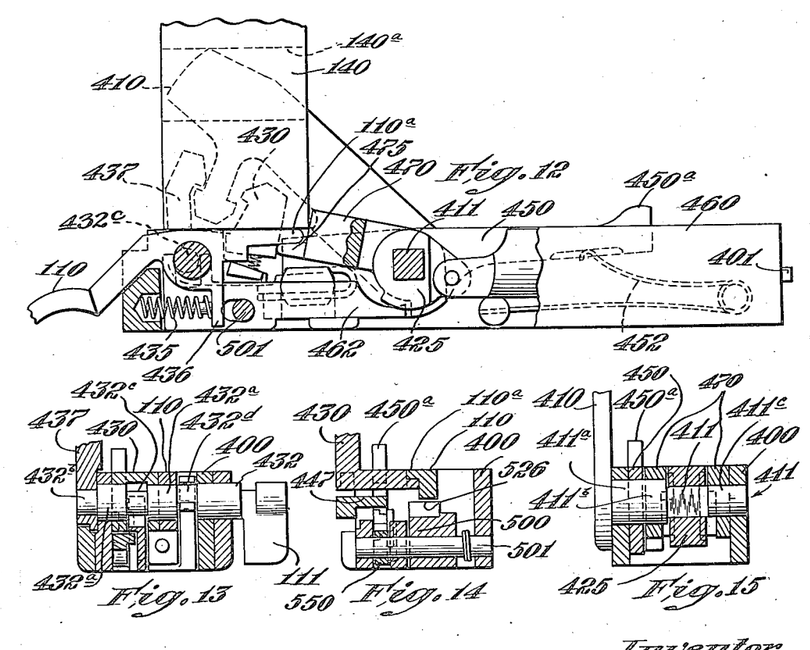
Fig. 12 is a view similar to Figs. 8, 9, 10 and 11, showing the firing mechanism set for automatic fire, the fire having been interrupted by release of the trigger, the hammer being restrained against firing by being held by the action slide which in turn is blocked in its rear position by the slide sear.
Figs. 13, 14 and 15 are vertical sections, taken on the lines 13—13, 14—14 and 15—15, respectively, of Fig. 3.
Figure 12A:
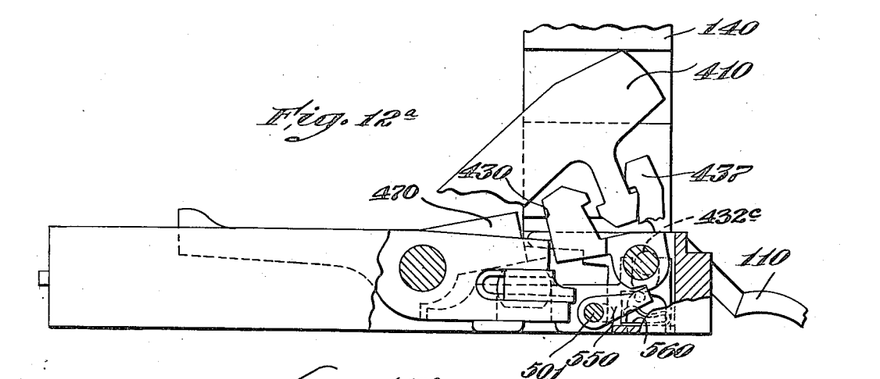
Fig. 12a is a left side elevation of the firing mechanism, corresponding to Fig. 12.
Figure 17:
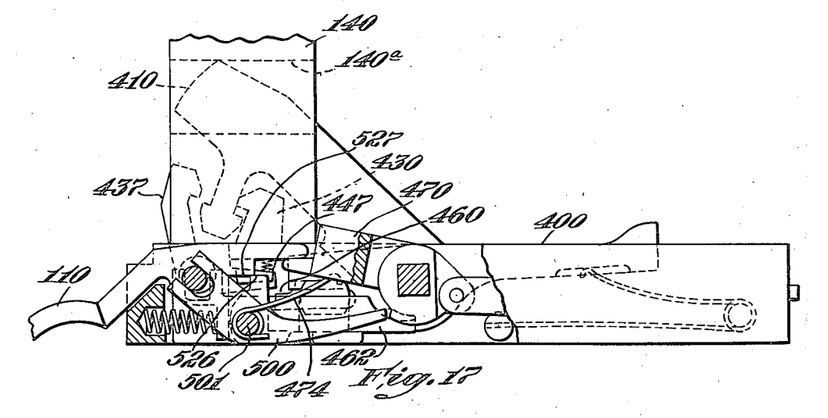
Fig. 17 is a view similar to Fig. 16, showing the firing mechanism set in safety position following automatic fire.

A hammer 410 is fastened on a shaft 411, rotatably mounted in opposite sides of the frame 400, the hammer being located so as to be wiped rearwardly by the action slide 140 as the latter moves to the rear after firing. Fig. 1 shows the hammer 410 in its forward position at the instant of firing, and Figs. 10, 12 and 17 show the extreme rearward position to which the hammer is carried by the rearward movement of the action slide 140. In this rearward position the hammer is held down by a shoulder 140a of the action slide.

Figures 2, 3:
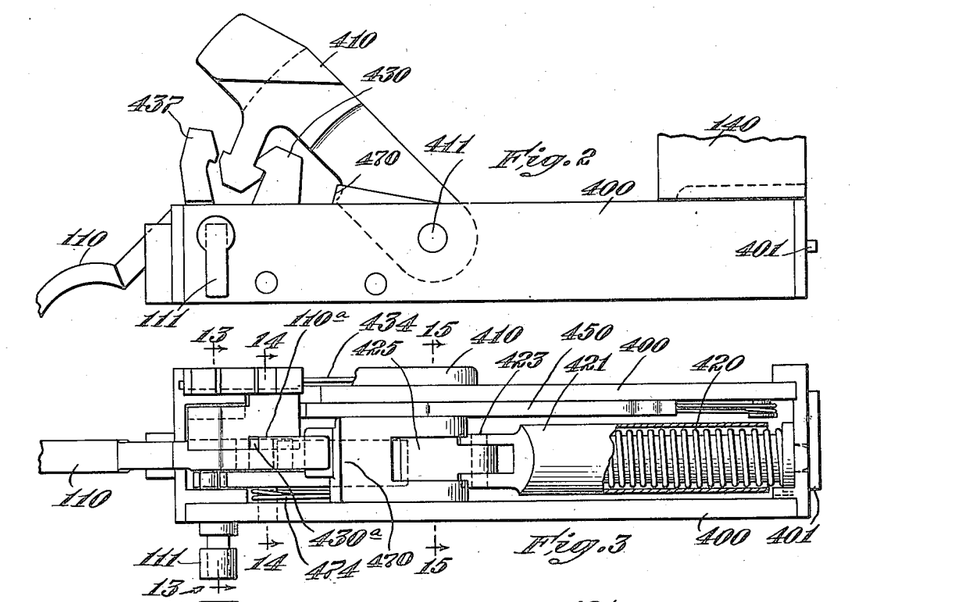
Fig. 2 is a right side elevation of the firing mechanism including a portion of the action slide of the gun.
Fig. 3 is a plan view of the firing mechanism of Fig. 2.
Figures 4, 5:
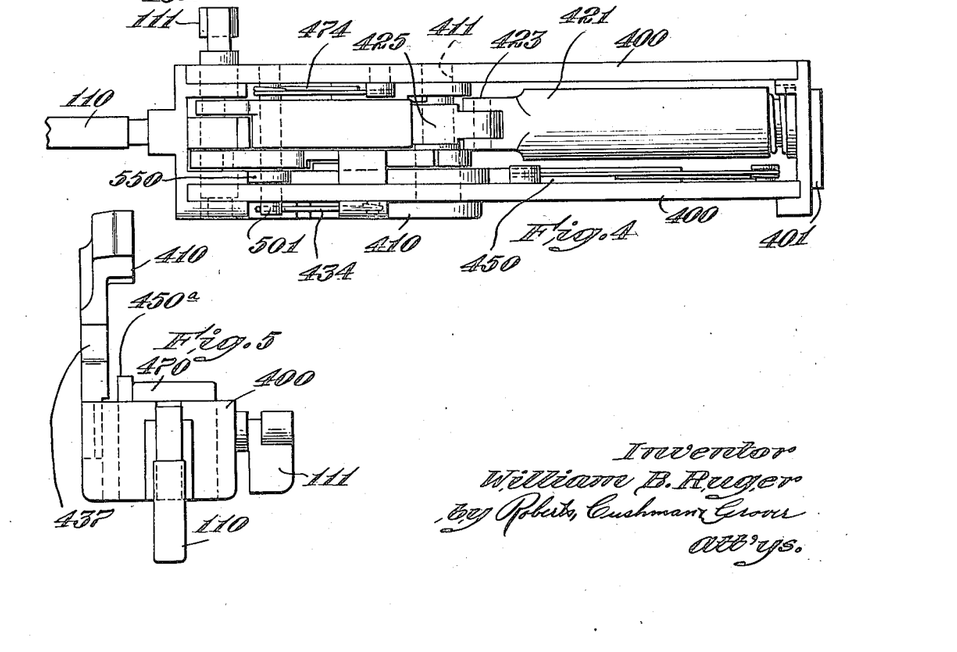
Fig. 4 is a bottom view of the firing mechanism of Fig. 2.
Fig. 5 is a rear end view of the firing mechanism of Fig. 2 looking forwardly from the trigger end.
Figure 6:
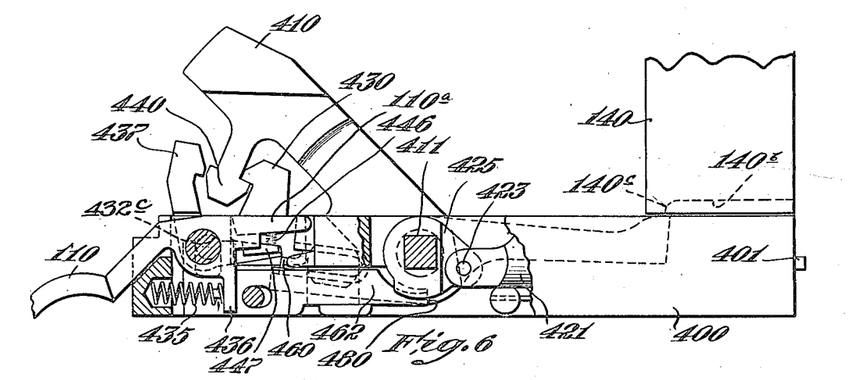
Fig. 6 is a right side elevation of the firing mechanism including the action slide, with parts broken away and removed, showing the firing mechanism set for semi-automatic fire and with the trigger released.
Figure 6A:
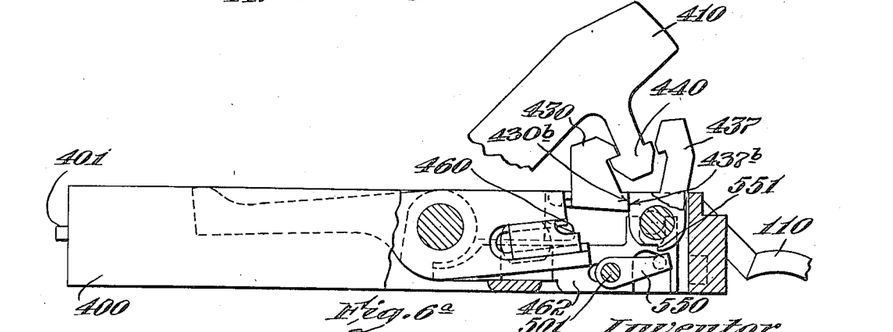
Fig. 6a is a left side elevation of the firing mechanism, corresponding to Fig. 6.

The gun is normally cocked and the hammer is normally urged with a strong force to swing forwardly to fire, the hammer being restrained either by the action slide 140 or by some of the several restraining elements in the firing mechanism. The forward movement of the hammer is caused by a compression spring 420 (Fig. 3) of which the forward end abuts against the front of the firing mechanism frame, and the rearward end acts on the interior of a sleeve 421. Sleeve 421, as shown in Figs. 3, 4, 6 and other figures, is pivotally connected at 423 to a crank sleeve 425 mounted on a square portion of the hammer shaft 411. Thus the hammer is thrown forward by expansion of the spring 420, and as the hammer is returned to cocked position, the spring 420 is compressed.

Figures 18, 19, 20, 21, 22, 23:
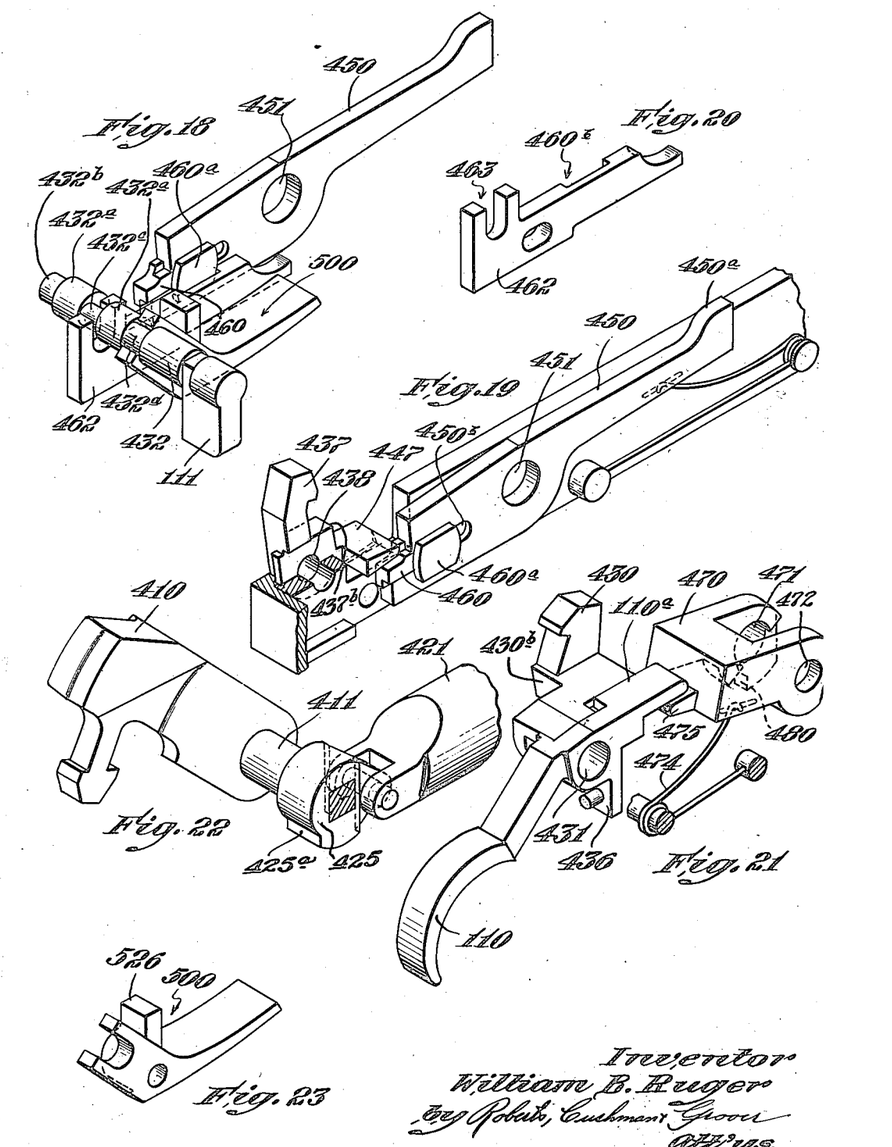
Fig. 18 is a perspective view of the fire control cam shaft, fire control bar, automatic sear actuating lever and safety lock, these parts being shown as set for automatic fire.
Fig. 19 is a fragmentary perspective view of a portion of the frame of the firing mechanism, the automatic sear and the automatic sear actuating lever.
Fig. 20 is a perspective view of the fire control bar.
Fig. 21 is a fragmentary perspective view of the slide sear (partially broken away), the manual sear and trigger.
Fig. 22 is a perspective view of the hammer, the hammer actuating shaft, and the connection from this shaft to the hammer-actuating spring sleeve.
Fig. 23 is a perspective view of the safety lock.
Figure 24:
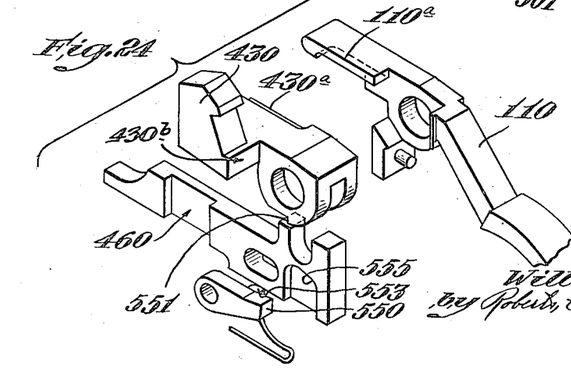
Fig. 24 (on the sheet containing Figs. 8a and 12a) is an exploded perspective view of the trigger, manual sear, fire control bar, and manual sear latch.

A primary or manual sear 430 is provided and operates to initiate each shot of semi-automatic fire and the first burst of automatic fire after changing from safety or semi-automatic to full-automatic. As shown in Figs. 3, 21 and 24, a forwardly extending portion 430a of the sear 430 is recessed along one side and is overlaid by a forwardly and laterally extending portion 110a of the trigger. Both the sear 430 and the trigger 110 are bored to rotate upon cylindrical coaxial parts 432ª (Figs. 13 and 18) of a fire control cam shaft indicated generally by the reference character 432.

The manual sear 430 might be referred to as a primary sear because it is adapted to withhold fire until the trigger is squeezed.

Any suitable trigger spring 435, reacting on a depending extension 436 of the trigger and upon the rear wall of the hammer mechanism frame, is adapted to urge the forward end of the trigger upwardly.

Figure 7:
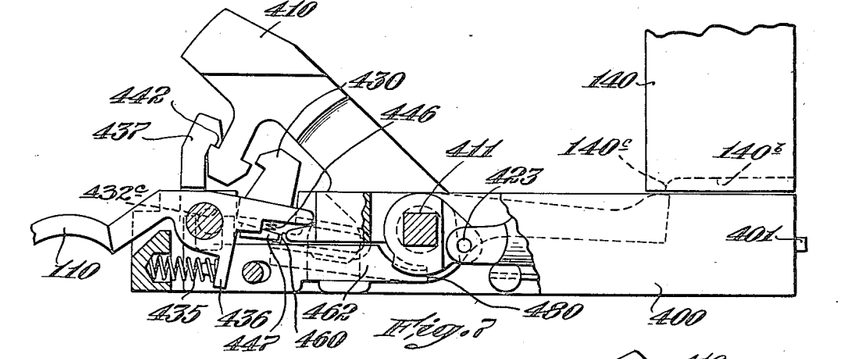
Figure 25:
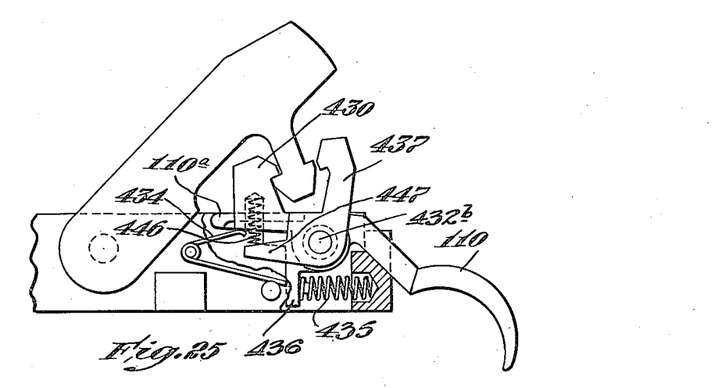
Fig. 25 is diagrammatic view taken from the left side of the gun, with parts broken away and omitted, showing particularly the hammer, trigger, manual sear, automatic sear, and the springs which react on these parts.
Figure 26:
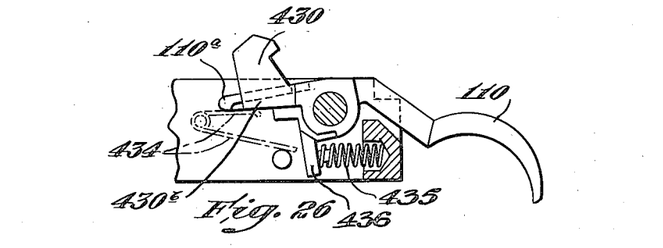
Fig. 26 is a view similar to Fig. 25 showing the trigger and manual sear in the position assumed by these parts when the trigger is pulled.
Figure 27:
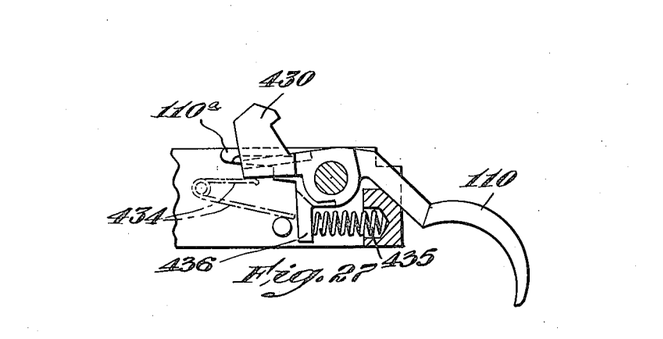
Fig. 27 is a view similar to Fig. 26 showing the position of the manual sear during and after a burst of automatic fire, and showing the trigger released as at the end of the burst of fire.

The manual sear 430 is urged to follow the upward movement of the forward end of the trigger, and to move into the hammer engaging position of Figs. 1, 2, 6, 8, 12, 8ª, 16 and 25 by means of a leaf spring 434 which bears upon the lower face of the forward portion of the sear 430, as shown in Figs. 25, 26 and 27. The sear 430 is movable by the trigger to hammer-disengaging position, as indicated in Figs. 7, 12ª, 26 and 27. It may also (during automatic fire) be latched in such hammer-disengaging position, as more fully explained subsequently, and the trigger when subsequently released will then return to its normal released position independently of the sear 430, as shown in Figs. 12, 12ª and 27.

An automatic sear 437 is adapted to cooperate with the primary sear in both automatic fire and semi-automatic fire, but performs different functions in these two types of fire.

In semi-automatic fire, where the object is to fire a single shot each time the trigger is pulled, the automatic sear performs the function of catching and holding the hammer until the trigger is released and the manual sear is again brought into position to engage the hammer and withhold fire.

In automatic fire, where it is desired that the gun should continue firing as long as the trigger is held pulled, the automatic sear engages and detains the hammer after each shot, releasing the hammer only at the appropriate time in the cycle of fire.

This automatic sear 437 might be referred to as a secondary sear because it acts to withhold or regulate the fire after the trigger has been pulled.

As shown particularly in Fig. 19, the automatic sear is cylindrically bored at 438, and this cylindrical bore is adapted to receive and turn on a cylindrical coaxial portion 432ᵇ of the fire control cam shaft 432 (Figs. 13 and 18).

Figure 8:
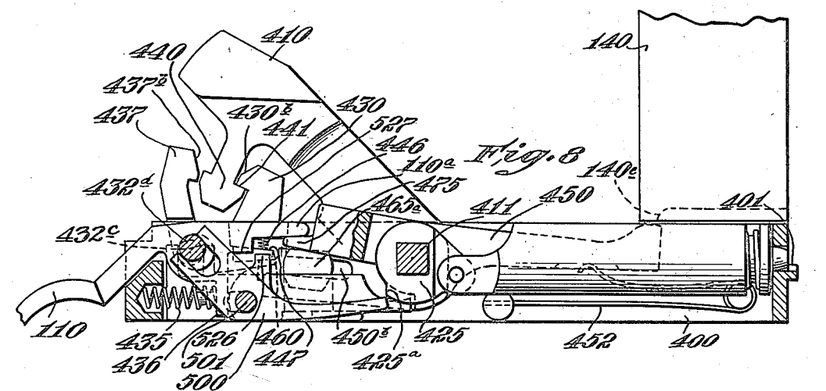
Fig. 8 is a right side elevation of the firing mechanism including the action slide, with parts broken away and removed, showing the firing mechanism set for automatic fire and with the trigger released. The action slide is shown in its forward position, as it may sometimes be before beginning automatic fire.
Figure 8A:
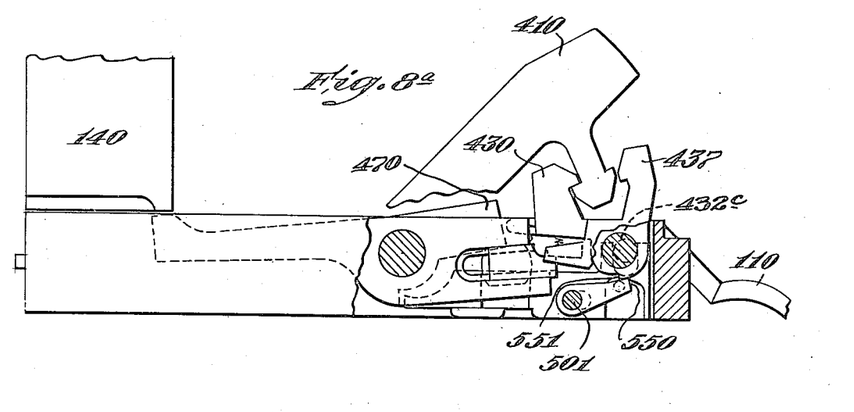
Fig. 8a is a left side elevation of the firing mechanism, corresponding to Fig. 8.
Figure 9:
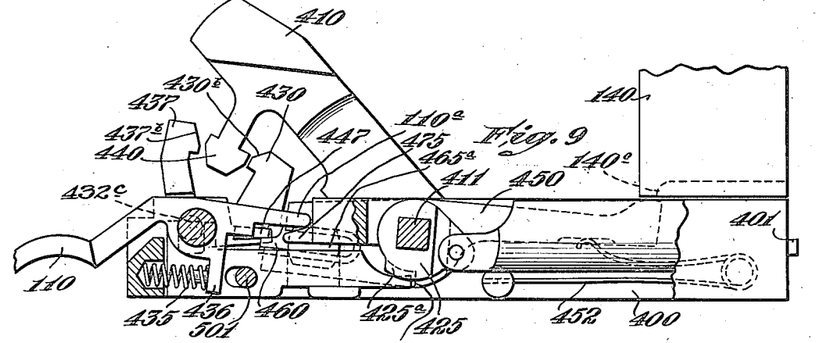
Fig. 9 is a view similar to Fig. 8, showing the firing mechanism set for automatic fire, the trigger pulled and the hammer moving forward.

Referring to Fig. 8, for example, the hammer 410 is provided with a downwardly extending double shouldered prong 440, one shoulder 441 being engageable under the head of the manual sear 430 (Figs. 2, 6 and 8), and the other shoulder 442 being engageable under the head of the automatic sear 437 (Fig. 7). The heads of the two sears are provided with sloping entrance surfaces 430ᵇ and 437ᵇ, respectively, and the prong 440 of the hammer is correspondingly provided with sloping surfaces to permit entry of the prong between the sears. The sears are so related that when the manual sear 430 is in hammer-engaging position (Fig. 6), the automatic sear 437 is held in hammer-releasing position, i. e., clear of the path of the prong 440, and when the manual sear is moved out of the path of the prong into hammer-releasing position (Fig. 7), the automatic sear is yieldingly urged into hammer-engaging position. The positive movement of the automatic sear to hammer-releasing position when the manual sear is moved to hammer-engaging position is accomplished by engagement of a shoulder 430ᵇ (Figs. 6ª and 21) on the manual sear with a corresponding shoulder 437ᵇ (Figs. 6ª and 19) on the automatic sear. The yielding force urging the automatic sear into hammer-engaging position when the manual sear is moved to hammer-releasing position is supplied by a suitable spring 446 which, as shown in Fig. 25, bears against a generally horizontal forward extension 447 of the automatic sear and extends into a recess in the primary or manual sear 430. The manual and automatic sears thus tend to move as a unit under the influence of the trigger and the manual sear spring 434. The relative positions of these sears can, however, be displaced so that they separate when the prong 440 forces an entrance between them while the hammer is being cocked, when the trigger is pulled, and when the manual sear is latched in hammer-releasing position and the secondary sear is controlled by automatic firing mechanism to time the shots in automatic fire, as subsequently described.

Referring to Figs. 6 and 7, which relate to the cycle of semi-automatic fire, pulling the trigger disengages the manual sear 430 from the hammer prong, and allows the hammer to swing forward and fire a shot. The automatic sear 437, under the influence of the manual sear and the spring 446, follows the manual sear's clockwise movement as soon as the hammer prong, released by the manual sear, moves out of the path of the automatic sear. The automatic sear thus moves into hammer-engaging position so that it snaps over the shoulder 442 of the hammer prong when the hammer is swung backwardly by the action slide 140. With the trigger still pulled, as in Fig. 7, the automatic sear will then hold the hammer prong until the trigger is released, whereupon the parts will resume the positions of Fig. 6, awaiting the next pull of the trigger. In this sequence of operations, the ultimate control of the hammer is in the manual sear which is directly controlled by the trigger, and the automatic sear performs the function of detaining the hammer in the event that it is moved to cocked position before the manual sear is restored to hammer-engaging position. When the automatic sear has caught the hammer, and then releases it to the manual sear as the trigger is released, the hammer will rise slightly because the engaging surface of the manual sear is slightly higher than that of the automatic sear. When the trigger is pulled, it is thus impossible for the automatic sear to re-engage as the manual sear disengages.

In the cycle of automatic fire of Figs. 8 to 12, the manual sear is removed from under the direct control of the trigger and held in an inactive position as soon as the trigger is pulled to disengage the manual sear from the hammer. A principal purpose of removing the manual sear from under the direct control of the trigger and holding it inactive during automatic fire is to prevent catching the hammer by the manual sear in case the trigger is released after the action slide has started forward but before the automatic sear trip lever has been depressed, and consequent stopping of firing without return of the slide to its rear position. In the construction shown, during automatic fire, release of the trigger (regardless of the momentary position of the action slide) will not interfere with the proper return of the slide to its rear position.

The fire control cam shaft 432, operated by the fire control handle 111, is provided with an eccentric portion 432ᶜ which fits within a slot 463 of a longitudinal shifter member 462. Rotation of the fire control cam shaft shifts the shifter member 462 forwardly and backwardly, the forward position being that of semi-automatic fire and the rear position being that of automatic fire.

The shifter member 462 controls a latch 550 (Figs. 6ᵃ, 8ᵃ, 12ᵃ and 24) adapted to engage behind a shoulder 551 on the hub of the manual sear 430 to latch the sear in hammer-disengaging position as shown in Fig. 12ᵃ. A cam-follower 553 on the latch extends into a cam slot 555 on the shifter member 462. The cam slot 555 is shaped so that in the rear or automatic fire position of the shifter member the latch is free to rise under the influence of a spring 560 (Fig. 12ᵃ) sufficiently high to latch the sear 430. The latch can not latch the sear, however, until the sear is first moved to hammer-releasing position so that the shoulder 551 is in position to be engaged by the latch. The manual sear 430 is, therefore, not taken out from control of the trigger upon setting the gun for automatic fire, but is only taken out from control of the trigger as soon as this sear is thereafter moved by the trigger to allow the first shot to be fired. Fig. 12ᵃ shows the manual sear thus latched in a hammer-releasing position, the trigger restored to normal unpulled position during suspension of automatic fire, and Fig. 27 shows the manual sear and trigger separately in this condition.

With the manual sear latched in hammer-disengaging position, as soon as the first shot of automatic fire is instituted, the automatic sear is urged by the spring 446 into hammer-engaging position. Automatic firing mechanism, now to be described, causes the automatic sear to release the hammer at the appropriate times for subsequent shots of automatic fire.

As shown in Figs. 3, 8 to 12, 15, 18 and 19, an automatic sear trip lever 450 is pivotally mounted on a cylindrical concentric portion 411ᵃ (Fig. 15) of the hammer shaft 411 so as to be rotatable freely thereon. A spring 452 yieldably urges the forward arm of the sear trip lever upwardly so that its enlarged forward portion 450ᵃ is adapted to extend into a longitudinal recess 140ᵇ in the action slide 140. As shown in Fig. 6, and other figures, the recess 140ᵇ terminates near the rear of the action slide 140 in a curved surface 140ᶜ adapted to cam downwardly the forward portion 450ᵃ of the sear trip lever. Thus, at nearly the end of the forward return movement of the slide (and the accompanying bolt), the slide forces the automatic sear trip lever to turn in a clockwise direction against the action of the spring 452. The rear end of the automatic sear trip lever is slotted at 450ᵇ to receive a longitudinally slidable connector element 460 (Fig. 19) of which the rear end is adapted to extend under a laterally extending ledge portion of the forward extension 447 of the automatic sear. An enlarged laterally extending head portion 460ᵃ of the connector element fits in a vertical slot 460ᵇ of the longitudinally slidable fire control shifter member 462 (Figs. 18 and 20). Fig. 18 and Figs. 8 to 12 show the fire control cam shaft as turned to move the shifter member 462 to its rear position so as to bring the connector element 460 underneath the forward extension 447 of the automatic sear for automatic fire.

Rotation of the fire control cam shaft to the position shown in Figs. 6 and 7 moves the connector element 460 forwardly sufficient so that the automatic sear trip lever is disconnected from the automatic sear, and in this position, which is the position for semi-automatic fire, the automatic sear is not controlled by the automatic sear trip lever. In automatic fire, however, the automatic sear, which engages and detains the hammer prong when the hammer is thrown back, is released from the hammer prong by the action of the automatic sear trip lever as the action slide 140 nears its forward position.

It has been explained how the recoil spring 142 (see, for example, Fig. 10) is adapted to return the action slide 140 to forward position, delivering a new cartridge to the chamber and closing and locking the bolt. It is desirable, however, at the end of a burst of full automatic fire to avoid feeding a new cartridge to the chamber and to avoid closing and locking the bolt, so as to avoid leaving a cartridge in the hot chamber, and so as to leave the chamber open to the cooling effect of the air. This is accomplished by slide sear mechanism which is adapted to retain the action slide in its rear position.

Figure 16:
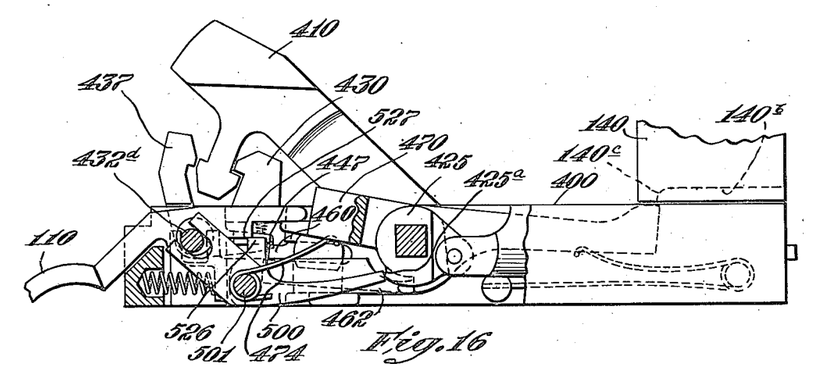
Fig. 16 is a right side elevation of the firing mechanism including the action slide with parts broken away and removed, showing the firing mechanism set in safety position following semi-automatic fire.
Figure 16A:
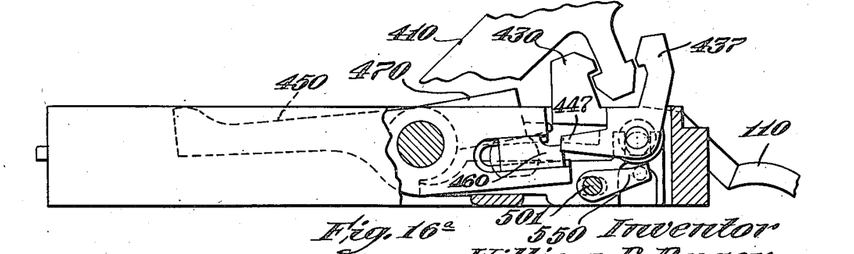
Fig. 16a is a left side elevation of the firing mechanism, corresponding to Fig. 16.

Referring to Figs. 2, 4, 8, 12 and 21, the slide sear mechanism includes a slide sear 470 (Fig. 21) having a bifurcated forward portion cylindrically bored at 471 and 472 so as to turn freely upon cylindrical coaxial portions 411ᵇ and 411ᶜ of the hammer shaft 411 (Fig. 15). The slide sear 470 is yieldingly urged upwardly from depressed position, such as shown in any of Figs. 6, 7 or 10, toward the elevated position, such as shown in Figs. 2, 8, 12 or 16 by any suitable spring 474 (Figs. 16, 17 and 21). In the elevated position of the slide sear it lies in the path of the action slide 140, and though capable of being depressed by the rearward movement of the slide, the slide sear springs upwardly to the position of Fig. 12 in front of the slide, preventing forward movement of the slide and its associated cartridge-feeding mechanism and bolt. The upward movement of the slide sear 470 is limited by a projection 475 on the slide sear engaging on the under side of the forwardly extending portion 110ᵃ of the trigger, as shown for example in Figs. 8, 12 and 21. The trigger, when pulled, accordingly is adapted to depress the slide sear to its lower or inactive position.

Retention of the action slide in its rear position and consequent prevention of the feeding of a new cartridge and of the closing of the bolt is not desired following a shot of semi-automatic fire, and mechanism is provided for disabling the slide sear mechanism when the gun is set for semi-automatic fire. Referring to Figs. 18, 20, 21 and Figs. 6 and 7, the shifter member 462, which is operated by the fire control cam shaft to connect and disconnect the automatic sear trip with the automatic sear, is further employed to hold the slide sear 470 depressed when the gun is set for semi-automatic fire. As shown in these figures, the forward end of this shifter member 462 is curved to fit under a rounded hub portion of one of the legs of the slide sear 470. In the forward position of this shifter member 462 its forward end engages and pushes a shoulder 480 (shown in dotted lines in Fig. 21) of the hub portion of the slide sear. Forward movement of the shifter member 462 thus turns the slide sear downwardly to the position of Figs. 6 and 7, holding it there so long as the gun is set for semi-automatic fire. Similarly, when the fire control cam shaft is turned to the position of automatic fire, rearward movement of the shifter member 462 releases the shifter element from the slide sear 470, allowing the slide sear to rise to an operative position.

The cycle of semi-automatic fire may begin with the mechanism in the condition shown in Fig. 6, the action slide 140 being forward, and the bolt accordingly being closed and locked with a cartridge in the chamber. Pulling the trigger releases the hammer from the manual sear 430 and fires the gun. The action slide 140 and its associated bolt and feeder mechanism move backward to the rear position after the shot but are returned to the forward position in readiness for the next shot. The hammer, driven backwardly by the action slide 140 is caught by the automatic sear 347 if the trigger is still held. This condition of the parts is shown in Fig. 7. Release of the trigger then merely causes the hammer to be engaged by the manual sear 430 instead of the automatic sear 437, and the parts are then as shown in Fig. 6 ready for the next shot.

Under some circumstances the gun may be in a condition of suspended automatic fire when it is desired to begin firing semi-automatically. As indicated above, in the condition of suspended automatic fire the action slide is held in its rearward position, as shown in Fig. 12. To prepare the gun for semi-automatic fire it is only necessary to turn the fire control cam shaft to the position of semi-automatic fire. This moves the shifter element 462 forwardly, disconnecting the automatic sear trip lever 450 from the automatic sear 437, depressing the manual sear latch 550, and subsequently depressing the slide sear 470. With the slide sear 470 depressed, the action slide 140 is automatically restored to forward position, feeding a fresh cartridge into the chamber and closing and locking the bolt. The parts are then in the position of Fig. 6 ready to fire semi-automatically when the trigger is pulled.

If the gun is in the position of Fig. 6 with its action slide forward as it would be when set for semi-automatic fire, turning the fire-control cam shaft to a position for automatic fire causes the parts to assume the position of Fig. 8. Then, pulling the trigger disengages the manual sear 430 from the hammer prong, allowing the hammer to fire and begin a cycle of automatic fire. Thus, in order to shift from a setting for semi-automatic fire (Fig. 6) to a setting for automatic fire (Fig. 8), it is only necessary to turn the fire-control cam shaft which operates the shifter member 462 and its associated parts. It is a distinct advantage that the gun when cocked and ready for semi-automatic fire can be made ready for automatic fire by a mere turn of the fire-control cam shaft, there being no need to manipulate the slide.

The several positions of the fire control handle 111 which controls the fire-control cam shaft are shown in Fig. 1ª. In that figure the handle 111 is shown in full lines in its downward position wherein the fire control cam shaft is set for automatic fire. The horizontal dotted line position of the handle 111 corresponds to the safety position of the fire-control cam shaft, and the vertical dotted line position of the handle 111 represents the position in which the fire-control cam shaft is set for semi-automatic fire. The fire-control handle 111 is yieldingly retained in whichever of these positions it is set in by the pressure of a spring 108ª on one of its flat sides or on its flat inner end. The spring 108ª can conveniently be formed as an integral part of a clamp 108 that secures the receiver rear plate 102 to the receiver.

The positions of the various parts of the gun in the semi-automatic setting and in the automatic setting have been described above. It will be apparent from the various positions of the fire-control handle 111 that in order to change from semi-automatic fire to automatic fire, or vice versa, it is necessary to pass through the safety position of the fire-control handle and cam shaft and the parts operated thereby.

There is associated with the fire-control cam shaft a safety lock 500, shown separately in Fig. 23, and shown as associated with the fire-control cam shaft in Fig. 18. The safety lock also appears in an inactive position in Fig. 8, and in an active or safety position in Fig. 16. Referring, for example, to Fig. 16, the safety lock is pivotally mounted on pin 501, and its rear slotted end engages an eccentric portion 432$^d$ of the fire-control cam shaft so that rotation of the fire-control cam shaft 90° from either the automatic or semi-automatic position to the safety position rotates the safety lock 500 in a counterclockwise direction from its inactive position, such as shown in Fig. 8, to its safety position of Fig. 16. This raises the right-hand or forward end of the safety lock into the path of a projection 425ª on the hammer crank sleeve 425. In this position the safety lock blocks forward movement of the hammer toward firing position.

In either the automatic or semi-automatic settings of the gun the lock does not interfere with the pulling of the trigger, but in the safety position an upstanding projection 526 on the safety lock is carried beneath a shoulder 527 on the trigger. In this position the safety lock thus prevents the trigger from being pulled.

The gun can not be put into safety position with its trigger in the pulled position, because the upstanding projection 526 on the safety lock will not pass under the shoulder 527 on the trigger if the trigger is in the pulled position. Thus the portion 526 on the safety lock and the portion 527 on the trigger constitute portions that interfere to prevent pulling the trigger in the safety position, and also interfere to prevent entry of the safety lock into the safe position so long as the trigger is pulled.

The gun may be put into safety position from either the semi-automatic or automatic setting, and can be put into the safety position when the action slide is forward, as shown in Fig. 16, or when the action slide is in its rear position, as shown in Fig. 17. When set for safety with the action slide in its rear position (as when the safety position follows a burst of automatic fire), the action slide will continue to be held in its rear position by the slide sear 470, because in the safety position of the fire-control cam shaft, the shifter member 462 is not far enough forward to depress the slide sear. In this safety condition of Fig. 17, the hammer is not only blocked by the safety lock 500 but is also held down by the action slide 140. The slide sear 470 can not be depressed to release the action slide 140 because, as explained above, the trigger is blocked by the projection 526 on the safety lock.

The action slide may be either in the forward or rearward position preceding automatic fire. Referring to Figs. 16 and 17 which show the safety settings of the gun with the action slide in the forward and rearward positions, respectively, it will be observed that in each of these settings, with the automatic sear in the hammer-releasing position, the shiftable connector element 460 can by turning the fire-control cam shaft be brought back underneath the laterally extending ledge portion of the horizontal forward extension 447 of the automatic sear. Thus, the automatic sear can be connected with the automatic sear trip lever regardless of whether the action slide is in its forward position actuating the automatic sear trip lever, or in its rearward position not actuating the automatic sear trip lever.

With the action slide in the forward position, connection of the automatic sear trip lever with the automatic sear is only possible when the automatic sear is in hammer-disengaging position, because otherwise the laterally extending ledge portion of the horizontal forward extension 447 of the automatic sear would block and interfere with rearward movement of the slidable connector 460. Thus, for instance in the position of the sears shown in Fig. 7, with the action slide forward and the hammer momentarily under the control of the automatic sear only, the automatic sear cannot be connected with the automatic sear trip lever, and the manual sear must first rise to hammer-engaging position and carry the automatic sear to hammer-releasing position before such connection of the automatic sear and the automatic sear trip lever can take place. It is thus assured that the manual sear will be in hammer-engaging position at the time the automatic sear trip lever is connected with the automatic sear when such connection is made with the action slide in the forward position. This is deemed advantageous in preventing accidental discharge of the gun upon changing the setting to automatic fire while the action slide is in its forward position in the event there has been any failure of the manual sear to rise to hammer-engaging position. With the action slide in the rear position, connecting the automatic sear trip lever with the automatic sear would not be limited by the interference of parts just described because in the rear position of the action slide, where the automatic sear trip lever is not being actuated by the slide, there is considerable clearance between the slidable connector element 460 and the laterally extending ledge portion of the forward extension 447 of the automatic sear. But with the action slide in this rearward position, it is restrained against moving forwardly to fire the gun by means of the slide sear 470, which, in the automatic setting of the gun, remains raised until the trigger is pulled.

The safety mechanism of the gun is constructed in a way which assures that the hammer will always be cocked when the fire-control mechanism is turned to either automatic position or semi-automatic position from any other position. The gun is ordinarily carried at the safety position, and the user of the gun can be assured that if he changes the setting of the gun from safety to either automatic fire or semi-automatic fire, the hammer will be found to be cocked. Moreover, as indicated above, in changing from automatic to semi-automatic fire, or vice versa, the fire-control mechanism passes through the safety position. The user of the gun is, therefore, assured that in changing from one type of fire to the other the hammer will likewise be found to be cocked.

In the safety position the safety lock 500, as indicated above, extends into the path of the projection 425ª on the hammer crank sleeve 425, as shown in Fig. 16 or Fig. 17. The hammer crank sleeve 425 and its projection 425ª are so shaped that the safety lock 500 can be brought into engagement with this projection only when the hammer is cocked. If the hammer were forward, for instance in some such position as shown in Fig. 1, the upward movement of the forward end of the safety lock 500 would be blocked by the larger diameter portion of the hammer crank sleeve 425, preventing the safety lock and fire-control cam shaft from being turned into safety position.

The hammer mechanism is so constructed that in the safety position the manual sear will be in hammer-engaging position. It has been explained above how the trigger must be released before the gun can be set in the safety position. In going into the safety position from a setting for semi-automatic fire, the trigger being released as is necessary, the manual sear 430 will be in the hammer-engaging position shown in Fig. 6, and remain in this position when the fire-control cam shaft is turned toward the safety position of Fig. 16.

In going into the safety position from a setting for automatic fire, in case the gun has been set for automatic fire but the trigger has not been pulled, the manual sear 430 will remain in the hammer-engaging position as it was during such time as the gun was set for automatic fire but not yet fired. Turning the fire-control cam shaft to safety position will leave the manual sear 430 in the same hammer-engaging position.

In going into the safety position from a setting for automatic fire after a burst of automatic fire has been shot, releasing the trigger, after the burst of automatic fire, will have left the automatic sear in hammer-engaging position, as shown in Fig. 12. But in turning the fire-control cam shaft to safety position, the shifter member 462 moves forwardly, its cam slot 555 (Fig. 24) depresses the cam follower 553 on the manual sear latch 550, disengaging the latch from the manual sear and allowing the manual sear to rise under the influence of the spring 434, thus restoring the manual sear 430 to the hammer-engaging position of Figs. 25 and 17 from the hammer-releasing position of Fig. 12. The manual sear in moving to the hammer-engaging position causes the automatic sear to move to the hammer-releasing position as shown in Fig. 25.

Thus it is assured that in each instance in which the gun is put into safety position the manual sear 430 will be in position to restrain the hammer and the automatic sear 437 will be disengaged from the hammer.

It will be observed that when the gun is set for semi-automatic fire the action slide is forward between shots, and it has been explained previously how the slide moves automatically to this forward position if not already there when the fire-control cam shaft is turned to its semi-automatic setting.

Changes from semi-automatic setting to automatic setting, therefore, always take place with the action slide in the forward position. The hammer mechanism is so constructed that in changing from semi-automatic setting to automatic setting with the slide in this forward position (which is the position of the slide capable of actuating the automatic sear trip lever), the gun will not fire unintentionally. In the first instance, this is brought about by the fact that to enter automatic position the parts of the gun must pass through a safety position in which the trigger must be released and in which the manual sear occupies the hammer-engaging position, such as shown in either of Figs. 16 or 17.

During automatic fire the manual sear is held in hammer-releasing position, as previously explained, by means of the manual sear latch 550. But changing the setting of the gun to an automatic setting does not itself disengage the manual sear from the hammer but merely allows the latch to rise under the influence of the spring 560 and press against the hub of the manual sear so that when the trigger is next pulled, and only then, the manual sear will be held in hammer-releasing position by the latch. These features prevent the gun from being discharged by turning the fire-control cam shaft to an automatic setting with the action slide in the forward position, and it is unnecessary for the user of the gun to retract the action slide in changing the setting of the gun to automatic.

The hammer mechanism is likewise constructed so that there can be no accidental firing as the result of changing of the gun from automatic setting to semi-automatic setting. This change ends, as explained above, with the action slide forward, and if it takes place after a burst of automatic fire, it begins with the action slide in its rearward position and also with the manual sear latched in hammer-disengaging position. But notwithstanding the fact that the change begins with the manual sear in disengaging position and ends with the action slide in the position adapted to cause automatic fire by depressing the automatic sear trip lever, the gun can not be accidentally fired as a result of this change.

Referring to the shifter member 462 and the parts actuated thereby, this shifter moves in a forward direction during the change from automatic to semi-automatic setting. In the first fraction of an inch in its forward movement, during the 90° rotation of the fire-control cam shaft from automatic setting to safety, the shifter member 462 moves the connector element 460 (Fig. 19) forwardly to remove it from beneath the latterally extending ledge portion of the forward extension 447 of the automatic sear, thus disconnecting the connecting element 460 from the automatic sear as shown in Fig. 17. Figs. 6 and 7, in which the gun is in a semi-automatic setting, also show the connector element in a forward position, in which it is disconnected from the automatic sear.

Simultaneously with the forward movement of the connector element 460 in moving from automatic setting into safety setting, the cam slot 555 (Fig. 24) of the shifter member 462 moving forwardly reacts on the cam follower 553 of the manual sear latch 550 to force the latch out of engagement with the manual sear, allowing the manual sear to rise to hammer-engaging position.

The mechanism of the gun reaches safety position with the parts in this condition, that is with the connector element 460 disconnected from the automatic sear, and with the manual sear latch released from the manual sear. The slide sear is still raised in the path of the action slide.

Thereafter, after the fire-control cam shaft has passed beyond safety position, the remaining forward movement of the shifter member 462 depresses the slide sear 470, allowing the action slide to move forward. At this stage, however, the forward movement or forward position of the action slide is incapable of firing the gun because the sear trip lever 450 has been disconnected from the automatic sear and also because the manual sear has been allowed to rise to hammer-engaging position.

Even in case of failure of the manual sear to rise to hammer-engaging position, the hammer would be restrained against firing because in the event of the manual sear remaining down after being unlatched, the automatic sear, disengaged from the sear trip lever, would be held in hammer-engaging position by the spring 446 which causes the manual and automatic sears to tend to move as a unit. So, if the manual sear should not move to hammer-engaging position, the automatic sear would not move out of hammer-engaging position and the hammer would remain restrained.

I claim:

1. In a gun ararnged for automatic and semi-automatic fire, the combination of a hammer, an action slide arranged to retract the hammer to cocked position, an automatic sear adapted to restrain the hammer in cocked position, an automatic sear trip lever actuable by the action slide in the forward position of the latter, a disengageable connection between the automatic sear trip lever and the automatic sear, a slide sear arranged to restrain the action slide in its retracted position at the end of a burst of automatic fire, a fire-control shifter member movable from a position for automatic fire to a position for semi-automatic fire and in such movement operatively engageable with said disengageable connection and with said slide sear first to disconnect the automatic sear trip lever from the automatic sear and subsequently to release the slide sear from the slide, so that in changing from automatic fire to semi-automatic fire the automatic sear trip lever is rendered ineffective before the action slide is allowed to move into its forward position.

2. In a gun adapted for automatic and semi-automatic fire, the combination of a hammer, an action slide arranged to retract the hammer to cocked position, an automatic sear and a manual sear each arranged to restrain the hammer in cocked position, a latch arranged to restrain the manual sear in an ineffective position, means actuable by the action slide in the forward position of the latter to trip the automatic sear during automatic fire, a slide sear arranged to restrain the action slide in its retracted position at the end of a burst of automatic fire, a fire-control shifter member movable from a position for automatic fire to a position for semi-automatic fire and in such movement operatively engageable with said manual sear latch and with the slide sear first to release said latch from the manual sear and subsequently to release the slide sear from the slide, so that in changing from automatic fire to semi-automatic fire the manual sear latch is rendered ineffective before the action slide is allowed to move into its forward position.

3. In a gun adapted for automatic and semi-automatic fire, the combination of a hammer, an action slide arranged to retract the hammer to cocked position, an automatic sear and a manual sear each arranged to restrain the hammer in cocked position, a latch arranged during automatic fire to restrain the manual sear in an ineffective position, means actuable by the action slide in the forward position of the latter to trip the automatic sear during automatic fire, a slide sear arranged to restrain the action slide in its retracted position at the end of a burst of automatic fire, a trigger arranged to move the manual sear and slide sear to releasing positions, a fire-control shifter member movable from a position for automatic fire to a position for semi-automatic fire and in such movement operatively engageable with said manual sear latch and with the slide sear first to release said latch from the manual sear and subsequently to release the slide sear from the slide, and means for preventing such movement of the shifter member when the trigger is pulled, thereby to insure engagement of the manual sear and hammer before the slide is allowed to move forward.

4. In a gun adapted for automatic and semi-automatic fire, the combination of a hammer, an action slide arranged to retract the hammer to cocked position, an automatic sear and a manual sear each arranged to restrain the hammer in cocked position, a latch arranged to restrain the manual sear in an ineffective position, an automatic sear trip lever actuable by the action slide in the forward position of the latter, a disengageable connection between the automatic sear trip lever and the automatic sear, a slide sear arranged to restrain the action slide in its retracted position at the end of a burst of automatic fire, a fire-control shifter member movable from a position for automatic fire to a position for semi-automatic fire and in such movement operatively engageable with said disengageable connection, with said manual sear latch, and with said slide sear first to disconnect the automatic sear trip lever from the automatic sear and release said latch from the manual sear and subsequently to release the slide sear from the slide, so that in changing from automatic fire to semi-automatic fire the automatic sear trip lever and the manual sear latch are rendered ineffective before the action slide is allowed to move into its forward position.

5. In a gun adapted for automatic and semi-automatic fire, the combination of a hammer, an action slide arranged to retract the hammer to cocked position, a manual sear and an automatic sear each arranged to restrain the hammer in the cocked position, a slide sear arranged to restrain the action slide in its retracted position, a trigger arranged to cause the manual sear and slide sear to release the hammer and action slide respectively, an automatic sear trip lever actuable by the action slide in the forward position of the latter, a disengageable connection arranged to connect the automatic sear trip lever and the automatic sear, and a fire-control shifter member controlling the slide sear and the disengageable connection and arranged in one position to withhold the slide sear from engagement with the action slide and arranged in another position to connect the sear trip lever with the automatic sear, and a safety lock connected to move with the shifter member, intermediate the two said positions of the shifter member, into and out of a safe position, the trigger and safety lock having associated therewith portions arranged to interfere and prevent pulling the trigger in the safe position of the safety lock and prevent entry of the safety lock into safe position as long as the trigger is pulled.

6. In a gun adapted for automatic and semi-automatic fire, the combination of a hammer, an action slide arranged to retract the hammer to cocked position, a manual sear and an automatic sear each arranged to restrain the hammer in the cocked position, a latch arranged to restrain the manual sear in an ineffective position, a slide sear arranged to restrain the action slide in its retracted position, a trigger arranged to cause the manual sear and slide sear to release the hammer and action slide respectively, means actuable by the action slide in the forward position of the latter to trip the automatic sear during automatic fire, and a fire-control shifter member controlling the slide sear and the manual sear latch and arranged in one position to withhold the slide sear from engagement with the action slide and arranged in another position to allow the manual sear latch to move to position to engage the manual sear, and a safety lock connected to move with the shifter member, intermediate the two said positions of the shifter member, into and out of a safe position, the trigger and safety lock having associated therewith portions arranged to interfere and prevent pulling the trigger in the safe position of the safety lock and prevent entry of the safety lock into safe position as long as the trigger is pulled.

7. In a gun adapted for automatic and semi-automatic fire, the combination of a hammer, an action slide arranged to retract the hammer to cocked position, a manual sear and an automatic sear each arranged to restrain the hammer in the cocked position, a latch arranged to restrain the manual sear in an ineffective position, a slide sear arranged to restrain the action slide in its retracted position, a trigger arranged to cause the manual sear and slide sear to release the hammer and action slide respectively, an automatic sear trip lever actuable by the action slide in the forward position of the latter, a disengageable connection between the automatic sear trip lever and the automatic sear, and a fire-control shifter member controlling the slide sear, the disengageable connection, and the manual sear latch and arranged in one position to withhold the slide sear from engagement with the action slide, and arranged in another position to connect the sear trip lever with the automatic sear and to allow the manual sear latch to move to position to engage the manual sear, and a safety lock connected to move with the shifter member, intermediate the two said positions of the shifter member, into and out of a safe position, the trigger and safety lock having associated therewith portions arranged to interfere and prevent pulling the trigger in the safe position of the safety lock and prevent entry of the safety lock into safe position as long as the trigger is pulled.

8. In a firearm adapted for automatic and semi-automatic fire, the combination of an action slide, a hammer movable to cocked position by the action slide, a manual sear and an automatic sear arranged alternatively to engage the hammer to hold it cocked, means for causing the automatic sear to move with the manual sear in such manner that with the manual sear in hammer-engaging position the automatic sear is in a hammer-releasing position and with the manual sear in hammer-releasing position the automatic sear tends to assume a hammer-engaging position, an automatic sear trip lever actuable by the action slide in the forward position of the slide, a shiftable connector element arranged to connect and disconnect the automatic sear trip lever and the automatic sear, the shiftable connector element and the automatic sear having portions so shaped and disposed with relation to each other that, when the action slide is forward and actuating the automatic sear trip lever, the automatic sear when in hammer-engaging position blocks and when in hammer-releasing position permits movement of the shiftable connector element to a position operatively connecting the automatic sear trip lever and automatic sear.

9. In a firearm adapted for automatic and semi-automatic fire, the combination of an action slide, a hammer movable to cocked position by the action slide, a manual sear and an automatic sear arranged alternatively to engage the hammer to hold it cocked, means for causing the automatic sear to move with the manual sear in such manner that with the manual sear in hammer-engaging position the automatic sear is in a hammer-releasing position, an automatic sear trip lever actuable by the action slide in the forward position of the slide and a shiftable connector element arranged to connect and disconnect the automatic sear trip lever and the automatic sear, the shiftable connector element and the automatic sear having portions so shaped and disposed with relation to each other that, when the automatic sear is in hammer-releasing position, the shiftable connector element can be moved to a position operatively connecting the automatic sear trip lever and automatic sear regardless of whether the action slide is forward and actuating the automatic sear trip lever or rearward and not actuating the automatic sear trip lever.

10. In a firearm adapted for automatic and semi-automatic fire, the combination of an action slide, a hammer movable to cocked position by the action slide, a manual sear and an automatic sear arranged to restrain the hammer in cocked position, means for automatically releasing the automatic sear during automatic fire, a trigger for controlling the manual sear during semi-automatic fire and for causing initial release of the manual sear at the beginning of automatic fire, a manual sear latch arranged to restrain the manual sear in a position to release the hammer during a burst of automatic fire, a shiftable member for holding said latch in an inoperative position during semi-automatic fire, fire-control means movable to shift said shiftable member to a position in which the latch is free to move to an operative position with respect to the manual sear, and means for preventing such movement of the fire-control means without the trigger assuming a released position.

11. In a firearm adapted for automatic and semi-automatic fire, the combination of an action slide, a hammer movable to cocked position by the action slide, a manual sear and an automatic sear arranged to restrain the hammer in cocked position, means for automatically releasing the automatic sear during automatic fire, a trigger for controlling the manual sear during semi-automatic fire and for causing initial release of the manual sear at the beginning of automatic fire, a manual sear latch arranged to restrain the manual sear in a position to release the hammer during a burst of automatic fire, a shiftable member having a cam surface arranged to hold the latch in an inoperative position for semi-automatic fire and to allow the latch to move to an operative position for automatic fire, fire-control means for shifting said shiftable member, and means for preventing shifting movement of the shiftable member from a position for semi-automatic fire to a position for automatic fire without the trigger assuming a released position.

12. A firearm having therein a hammer, an action slide arranged to retract the hammer, a manual sear and an automatic sear each arranged to restrain the hammer in cocked position, a manual sear latch arranged to hold the manual sear out of hammer-engaging position, an automatic sear trip lever actuable by the action slide in the forward position of the latter, a disengageable connection between the automatic sear trip lever and the automatic sear, a slide sear arranged to restrain the slide in its rear position, a fire-control shifter member, a fire-control cam shaft having a cam engageable with the fire-control shifter member to shift the latter longitudinally of the gun, the fire-control shifter member having a portion engageable with the slide sear, a portion engageable with the shiftable connection, and a portion engageable with the manual sear latch to hold the latter in inoperative position, said portions of the fire-control shifter member being shaped and arranged with respect to each other so that initial forward movement of the fire-control shifter member disengages the disengageable connection and allows the manual sear latch to move to operative position and subsequent forward movement thereof moves the slide sear to inactive position.

13. A firearm having therein a hammer, an action slide arranged to retract the hammer, a manual sear and an automatic sear each arranged to restrain the hammer in cocked position, a manual sear latch arranged to hold the manual sear out of hammer-engaging position, an automatic sear trip lever actuable by the action slide in the forward position of the latter, a disengageable connection between the automatic seal trip lever and the automatic sear, a slide sear arranged to restrain the slide in its rear position, a fire-control shifter member, a fire-control cam shaft having a cam engageable with the fire-control shifter member to shift the latter longitudinally of the gun, the fire-control shifter member having a forward portion engageable with the slide sear, an intermediate slotted portion engageable with the shiftable connection, and a rearward cam portion engageable with the manual sear latch to hold the latter in inoperative position, said portions of the fire-control shifter member being shaped and arranged with respect to each other so that initial forward movement of the fire-control shifter member disengages the disengageable connection and allows the manual sear latch to move to operative position and subsequent forward movement thereof moves the slide sear to inactive position.

14. A firearm having therein a hammer, an action slide arranged to retract the hammer, a manual sear and an automatic sear each arranged to restrain the hammer in cocked position, a manual sear latch arranged to hold the manual sear out of hammer-engaging position, an automatic sear trip lever actuable by the action slide in the forward position of the latter, a disengageable connection between the automatic sear trip lever and the automatic sear, a slide sear arranged to restrain the slide in its rear position, a fire-control shifter member, a fire-control cam shaft having a cam engageable with the fire-control shifter member to shift the latter longitudinally of the gun, the fire-control shifter member having a portion engageable with the slide sear, a portion engageable with the shiftable connection, and a portion engageable with the manual sear latch to hold the latter in inoperative position, said portions of the fire-control shifter member being shaped and arranged with respect to each other so that initial forward movement of the fire-control shifter member disengages the disengageable connection and allows the manual sear latch to move to operative position and subsequent forward movement thereof moves the slide sear to inactive position, a safety lock arranged in its safety position to block pulling of the trigger and forward movement of the hammer, and a further cam on the fire-control cam shaft for operating the safety lock, the safety lock being movable thereby into and out of its safety position before said movement of the slide sear to inactive position.

15. In a gun adapted for automatic and semi-automatic fire, the combination of a hammer, an action slide arranged to retract the hammer to cocked position, a manual sear and a trigger therefor, an automatic sear, the manual sear and the automatic sear being arranged alternatively to restrain the hammer in cocked position, means yieldingly urging the manual sear into hammer-engaging position, a connection between the automatic sear and the manual sear for yieldingly urging the automatic sear to move to hammer-engaging position when the manual sear releases, means actuable by the action slide in the forward position of the latter to release the automatic sear during automatic fire, fire-control mechanism for setting the gun for semi-automatic and automatic fire, the fire-control mechanism including a movable part positioned to be blocked by a part of the trigger when the trigger is pulled, and means, rendered operative by movement of said fire-control mechanism past the position of blocking of said movable part, for restraining the manual sear in hammer-releasing position, the setting of the gun thereby being prevented from being changed from semi-automatic setting to automatic setting while the trigger is in pulled position.

16. In a gun adapted for automatic and semi-automatic fire, an action slide, a hammer, a manual sear and an automatic sear each arranged to restrain the hammer in a cocked position, a manual sear latch arranged to retain the manual sear in hammer-releasing position, means operable in automatic fire to trip the automatic sear when the action slide is in its forward position, said means including a disengageable connection with the automatic sear, a fire-control cam shaft, a fire-control shifter member movable by the fire-control cam shaft for rendering the manual sear latch operative and inoperative and for engaging and disengaging the disengageable connection with the automatic sear, said shifter member being movable from a position for semi-automatic fire in which the manual sear latch is rendered inoperative and the disengageable connection is disengaged, into a position for automatic fire in which the disengageable connection is engaged with the automatic sear and the manual sear latch is rendered operative, a safety lock movable by the fire-control cam shaft into and out of a safety position intermediate the automatic and semi-automatic positions of the shifter member, the hammer including a hub having a projection into the path of which the safety lock is movable in the safety position to block the hammer against forward movement, the hammer hub being shaped to interfere with and block movement of the safety lock to safety position when the hammer is not in cocked position.

17. A firearm having therein an action slide, a hammer arranged to be retracted by the action slide, a hammer shaft providing a pivot for the hammer, a manual sear and an automatic sear each arranged to restrain the hammer in cocked position, a slide sear arranged to restrain the action slide in its rear position, a trigger arranged to operate the manual sear and slide sear, an automatic sear trip lever operable by the action slide in the forward position of the latter, a fire-control cam shaft, a disengageable connection between the automatic sear trip lever and the automatic sear, and a fire-control shifter member actuable by the fire-control cam shaft and arranged to operate the disengageable connection; the trigger, manual sear and automatic sear being mounted on coaxial portions of the fire-control cam shaft, and the slide sear and the automatic sear trip lever being mounted on coaxial portions of the hammer shaft.

18. In a firearm adapted for automatic and semi-automatic fire, the combination of an action slide, a hammer movable to cocked position by the action slide, a manual sear and an automatic sear arranged to restrain the hammer in cocked position, means for automatically releasing the automatic sear during automatic fire, a trigger for controlling the manual sear during semi-automatic fire and for causing initial release of the manual sear at the beginning of automatic fire, a manual sear latch arranged to restrain the mnual sear in a position to release the hammer during a burst of automatic fire, a shiftable member arranged to hold the latch in an inoperative position for semi-automatic fire and to allow the latch to move an an operative position for automatic fire, fire-control means for shifting said shiftable member, and means for preventing shifting movement of the shiftable member from a position for semi-automatic fire to a position for automatic fire without the trigger assuming a released position.

WILLIAM B. RUGER.